(12) United States Patent
Cunetto et al.

(10) Patent No.: US 7,701,947 B2
(45) Date of Patent: *Apr. 20, 2010

(54) AUTHENTICATION FOR USE OF HIGH SPEED NETWORK RESOURCES

(75) Inventors: Philip Cunetto, Austin, TX (US); James M. Doherty, Georgetown, TX (US); Chien-Chun Lu, Austin, TX (US); Timothy Paul Schroeder, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 465 days.

This patent is subject to a terminal disclaimer.

(21) Appl. No.: 11/626,413

(22) Filed: Jan. 24, 2007

(65) Prior Publication Data
US 2007/0121643 A1 May 31, 2007

Related U.S. Application Data

(63) Continuation of application No. 09/927,474, filed on Aug. 13, 2001, now Pat. No. 7,187,678.

(51) Int. Cl.
*H04L 12/56* (2006.01)
(52) U.S. Cl. .................. 370/395.2; 370/475; 455/456.1; 709/227
(58) Field of Classification Search .............. 370/395.2, 370/475, 395.21, 395.52, 395, 395.1, 395.51, 370/389, 397, 399, 401, 420; 455/456.1, 455/456.2, 456.6; 713/168, 170, 183; 709/227–229
See application file for complete search history.

(56) References Cited

U.S. PATENT DOCUMENTS 4,494,231 A    1/1985    Slawy et al.

(Continued)

FOREIGN PATENT DOCUMENTS

EP    0961519    12/1999

(Continued)

OTHER PUBLICATIONS

Acharya et al ("Mobility Management in Wireless ATM Networks", IEEE, 1997 pp. 100-109.*

(Continued)

*Primary Examiner*—Frank Duong
*Assistant Examiner*—Habte Mered
(74) *Attorney, Agent, or Firm*—Greenblum & Bernstein, P.L.C.

(57) ABSTRACT

A network node sets up a virtual connection in a network based on a virtual connection request initiated from an access port different from a first location previously associated with an account of a user. The network node includes a receiver for receiving a signaling message from the access port requesting the virtual connection. The signaling message has at least one field modified to include an address of the access port. The network node further includes a profile database and a registration server. The profile database stores a service policy associated with the user account. The registration server stores an address of the first location associated with the user account as a default registration, determines whether the user is authorized to establish the virtual connection based on the service policy, and replaces the first location address with the access port address when the user is authorized.

20 Claims, 7 Drawing Sheets

U.S. PATENT DOCUMENTS

| | | | |
|---|---|---|---|
| 5,051,982 A | 9/1991 | Brown et al. | |
| 5,274,643 A | 12/1993 | Fisk | |
| 5,490,141 A | 2/1996 | Lai et al. | |
| 5,610,969 A | 3/1997 | McHerry et al. | |
| 5,764,645 A | 6/1998 | Bernet et al. | |
| 5,828,838 A | 10/1998 | Downs et al. | |
| 5,842,040 A | 11/1998 | Hughes et al. | |
| 5,892,924 A | 4/1999 | Lyon et al. | |
| 5,905,726 A | 5/1999 | Gupta | |
| 5,920,562 A | 7/1999 | Christie et al. | |
| 5,923,740 A | 7/1999 | Ito et al. | |
| 5,943,337 A | 8/1999 | Sasagawa | |
| 5,953,338 A | 9/1999 | Ma et al. | |
| 5,956,334 A | 9/1999 | Chu et al. | |
| 5,970,064 A | 10/1999 | Clark et al. | |
| 5,974,048 A | 10/1999 | Godse et al. | |
| 5,991,301 A | 11/1999 | Christie | |
| 5,999,514 A | 12/1999 | Kato | |
| 5,999,518 A | 12/1999 | Nattkemper et al. | |
| 5,999,532 A | 12/1999 | Terasaki | |
| 6,028,924 A | 2/2000 | Ram et al. | |
| 6,028,933 A | 2/2000 | Heer et al. | |
| 6,031,840 A | 2/2000 | Christie et al. | |
| 6,032,118 A | 2/2000 | Tello et al. | |
| 6,035,405 A | 3/2000 | Gage et al. | |
| 6,041,056 A | 3/2000 | Bigham et al. | |
| 6,041,109 A | 3/2000 | Cardy et al. | |
| 6,073,160 A | 6/2000 | Grantham et al. | |
| 6,078,575 A * | 6/2000 | Dommety et al. | 370/338 |
| 6,081,518 A | 6/2000 | Bowman-Amuah | |
| 6,094,437 A | 7/2000 | Loehndorf, Jr. et al. | |
| 6,097,720 A | 8/2000 | Araujo et al. | |
| 6,097,722 A | 8/2000 | Graham et al. | |
| 6,118,785 A | 9/2000 | Araujo et al. | |
| 6,137,793 A | 10/2000 | Gorman et al. | |
| 6,141,339 A | 10/2000 | Kaplan et al. | |
| 6,148,074 A | 11/2000 | Miloslavsky et al. | |
| 6,167,432 A | 12/2000 | Jiang | |
| 6,169,735 B1 | 1/2001 | Allen, Jr. et al. | |
| 6,181,693 B1 | 1/2001 | Maresca | |
| 6,219,348 B1 | 4/2001 | Allen, Jr. et al. | |
| 6,222,842 B1 | 4/2001 | Sasyan et al. | |
| 6,229,810 B1 | 5/2001 | Gerszberg et al. | |
| 6,252,857 B1 | 6/2001 | Fendick et al. | |
| 6,289,001 B1 | 9/2001 | Smyk | |
| 6,292,495 B1 | 9/2001 | Von Hammerstein et al. | |
| 6,298,043 B1 | 10/2001 | Mauger et al. | |
| 6,345,048 B1 | 2/2002 | Allen, Jr. et al. | |
| 6,345,051 B1 | 2/2002 | Gupta et al. | |
| 6,366,577 B1 | 4/2002 | Donovan | |
| 6,366,948 B1 | 4/2002 | Teibel | |
| 6,373,930 B1 | 4/2002 | McConnell et al. | |
| 6,389,011 B2 | 5/2002 | Allen, Jr. et al. | |
| 6,400,716 B1 | 6/2002 | Munakata et al. | |
| 6,434,612 B1 | 8/2002 | Hughes et al. | |
| 6,473,427 B1 | 10/2002 | Brodigan | |
| 6,473,430 B2 | 10/2002 | Sreedharan et al. | |
| 6,529,479 B1 | 3/2003 | Suzuki | |
| 6,542,475 B1 | 4/2003 | Bala et al. | |
| 6,563,835 B1 | 5/2003 | Chen | |
| 6,597,689 B1 | 7/2003 | Chiu et al. | |
| 6,618,381 B1 | 9/2003 | Miyamoto et al. | |
| 6,621,793 B2 | 9/2003 | Widegren et al. | |
| 6,633,569 B2 | 10/2003 | Hemmady | |
| 6,636,516 B1 | 10/2003 | Yamano | |
| 6,636,522 B1 | 10/2003 | Perinpanathan et al. | |
| 6,741,585 B1 | 5/2004 | Munoz et al. | |
| 6,801,508 B1 | 10/2004 | Lim | |
| 6,804,247 B1 | 10/2004 | Sasyan et al. | |
| 6,807,174 B2 | 10/2004 | Bernstein et al. | |
| 6,822,962 B1 | 11/2004 | Noake et al. | |
| 6,842,449 B2 | 1/2005 | Hardjono | |
| 6,859,457 B1 | 2/2005 | Tanaka | |
| 6,870,841 B1 | 3/2005 | Brown et al. | |
| 6,928,167 B1 | 8/2005 | Maeda et al. | |
| 6,937,595 B2 | 8/2005 | Barzegar et al. | |
| 6,937,598 B1 | 8/2005 | Hagirahim et al. | |
| 6,973,068 B2 * | 12/2005 | Inoue et al. | 370/338 |
| 7,187,678 B2 | 3/2007 | Cunetto et al. | |
| 2001/0026553 A1 * | 10/2001 | Gallant et al. | 370/395 |
| 2002/0010866 A1 | 1/2002 | McCullough et al. | |
| 2002/0024954 A1 * | 2/2002 | Cunetto et al. | 370/395.2 |
| 2002/0071427 A1 | 6/2002 | Schneider et al. | |
| 2002/0071472 A1 | 6/2002 | Dickson | |
| 2002/0126674 A1 | 9/2002 | Hemmady et al. | |
| 2002/0143959 A1 | 10/2002 | Ei-Baze et al. | |
| 2002/0150110 A1 | 10/2002 | Inbar et al. | |
| 2002/0156914 A1 | 10/2002 | Lo et al. | |
| 2003/0016676 A1 | 1/2003 | Allen, Jr. et al. | |
| 2003/0128698 A1 | 7/2003 | Darland et al. | |
| 2003/0133454 A1 | 7/2003 | Gallant et al. | |
| 2004/0107238 A1 | 6/2004 | Orton et al. | |

FOREIGN PATENT DOCUMENTS

| | | |
|---|---|---|
| JP | 8-186580 | 7/1996 |
| WO | 98/26627 | 6/1998 |
| WO | 98/36612 | 8/1998 |
| WO | 98/37727 | 8/1998 |
| WO | 99/30530 | 6/1999 |
| WO | 00/62496 | 10/2000 |
| WO | 02/12977 | 2/2002 |
| WO | 03/009528 | 1/2003 |

OTHER PUBLICATIONS

Search result for "http://www.acsac.org/1999/papers/thu-c-0830-winkelstein.pdf" in Internet Archive Wayback Machine to date article by Winkelstein, entitled "ATM Security VPN Case Study" published on web site "http://www.acsac.org/1999/papers/thu-c-0830-winkelstein.pdf".*

"Telcos to Open ATM SVC Floodgate", by Brian Riggs, published Mar. 1997, pp. 1-3, www.lantimes.com.

"Voice Over ATM Switched Virtual Circuits on the Cisco MC3810", pp. 1-5, www.cisco.com>, Jun. 2000.

"Do You Need Frame-to-ATM SVC", by Steve Taylor et al., published Jun. 2000, pp. 1-2, www.nwfusion.com.

cnfport: Configure Port—PXM1E, Cisco MGX 8830, MGX 8850 (PXM45 and PXM1E), and MGX 8950 Command Reference, Release 3, Part No. 78-14789-01 Rev. B0, Jan. 2003, p. 2-299.

"dspport: Display Port—PXM1E", Cisco MGX 8830, MGX 8850 (PXM45 and PXM1E), and MGX 8950 Command Reference, Release 3, Part No. 78-14789-01 Rev. B0, Jan. 2003, p. 2-749.

"Ipsilon's General Switch Management Protocol Specification: The Internet Society, 1998", version 2, by Newman et al., The Internet Society, Network Working Group, 1998, pp. 1-79.

Yager, C., "White Paper: Cisco Asymmetric Digital Subscriber Line Services Architecture", Cisco Systems, published on Jul. 3, 2000.

"SIP Extensions for Media Authorization," by W. Marshall et al., dated Feb. 2001, pp. 1-23, <draft-ietf-sip-call-auth-01.txt>.

"SIP Extensions for Media Authorization," by W. Marshall et al., dated Nov. 2000, pp. 1-25, <draft-ietf-sip-call-auth-00.txt>.

Clark et al., "Bandwidth-on-Demand Networks—A Solution to Peer-to-Peer File Sharing", BT Technology Journal, vol. 20, No. 1, Jan. 2002, pp. 53-63.

Loeser et al., "Distributed Video on Demand Services on Peer to Peer Basis", 1st International Workshop on Real Time LANs in the Internet Age, Jun. 18, 2002, pp. 1-4, http://www.hurray.isep.ipp.pt/rtlia2002/full_papers/20_rtlia.pdf.

"Efficient Routing of Packets for Multi-Media, Peer to Peer Applications", IBM Technical Disclosure Bulletin, May 1994, pp. 459-460.

"Method for the Conversion of Multimedia Streams to Packet Streams", IBM Technical Disclosure Bulletin, Jun. 1994, pp. 95-98.

Bauer et al., "The Personal Router", The Eight ACM International Conference on Mobile Computing and Networking, Sep. 23-28, 2002, p. 1.

"User Interface Design for Videoconferencing Entries", IBM Technical Disclosure Bulletin, Apr. 1994, pp. 539-540.

Clark et al., "The Personal Router Whitepaper", MIT Laboratory for Computer Science, Version 2.0, Mar. 2001,http://ana.1cs.mit.edu/anaweb/PDF/PR_whitepaper_v2.pdf.

English language Abstract of JP 8-186580, Jul. 16, 1996.

A printout of a website entitled "Abstract—Security for Asynchronous Transfer Mode (ATM) Networks", WPI Department of Electrical and Computer Engineering, which was last modified on Apr. 23, 1996.

A printout of a website entitled "ATM Security VPN Case Study", by Winkelstein, Celotek Corporation, Mar. 8, 2004.

Arup Acharya, Jun Li, and D. Raychaudhuri, "Mobile ATM: Architecture, Protocols and Implementation", IEEE, 1997.

Sihui Zhou et al, Efficient Location Management for Hybrid Wireless ATM Networks; Architecture and Performance Analysis, 1999, IEEE, pp. 378-381.

P.W. Reece et al., "The Broadband Call Control Demonstrator—A Platform for ITU-T, DAVIC and TINA-C Implementations", BT Technology Journal, vol. 16, No. 2, Apr. 1, 1998, pp. 155-168.

\* cited by examiner

AUTHENTICATION FOR USE OF HIGH SPEED NETWORK RESOURCES

The present application is a continuation application of pending U.S. patent application Ser. No. 09/927,474, filed on Aug. 13, 2001, the subject matter of which is expressly incorporated herein by reference in its entirety.

BACKGROUND OF THE INVENTION

1. Field of the Invention

The present invention relates to the field of telecommunications. More particularly, the present invention relates to associating a request for a switched virtual circuit (SVC) service in a high speed network to an originating subscriber, so that the network can apply the subscriber's individual service policies, and optionally registering an access port address to the subscriber.

2. Background Information

Currently, when network subscribers access a high speed network for SVC services, the port being used for the access is associated with the SVC service request. Thus, if multiple subscribers could access the network from a single port, each subscriber would not be uniquely associated with the network access. Similarly, if a subscriber could access the network from a location remote from the subscriber's normal access port (e.g., accessing from a public access port), the subscriber is not associated with the network access. In both cases, because the port is associated with the network access rather than the subscriber, control of access to the network is inadequate.

In a conventional telephone network, access requests do not require control for several reasons. For example, each connection across the network consumes a predetermined amount of bandwidth, regardless of the application employing the connection. In addition, a user in a conventional telephone network is limited to a single connection at each physical interface. In other words, there are natural, systematic limits on the resources a single subscriber is able to consume in the telephone network.

In high speed networks, a single connection can consume the bandwidth of many thousands of conventional telephone network connections. Moreover, many connections can be simultaneously active on a single interface to the network. Thus, due to the potential for depletion of available resources, authorization on a per connection request basis is more important in a high speed network than in the conventional public switched telephone network (PSTN). Accordingly, there is a need for reliable authentication and control of subscriber access to high speed networks.

High speed networks, such as ATM networks, are often configured to use switched virtual circuits (SVCs), which are temporary connections established by the user at the time of call set-up. SVCs generally provide a flexible bandwidth adjusted to accommodate the application being supported by the connection. Typically, customers using SVCs pay a network provider on a per connection time basis, as opposed to paying monthly fees, as for permanent connections. In high speed networks, the bandwidth and SVCs themselves are both limited network resources. Therefore, from the network provider's point of view, each request from a subscriber to establish an SVC must be policy checked to determine if the subscriber has the right to the requested resources, as based on a prior service level agreement.

Furthermore, high speed network subscribers are often groups of users as opposed to individual users. Each group is allocated a combined set of resources, including SVCs and bandwidth, collectively available to the entire group at any one time. Again, close monitoring of the use of group allocated resources is necessary to avoid overcrowding and interference on the network and consumption in excess of the services contracted for by the users.

When a subscriber requests access from a network assigned, non-shared location, the network can identify the port requesting access and can identify the subscriber based upon a known association between the fixed port and the subscriber. In the case of nomadic users, however, ports are not associated with subscribers, preventing simple identification of nomadic users. Thus, remote port SVC connections do not provide the subscribers with the service policies to which the subscribers are entitled.

Furthermore, even when a subscriber originates a request from a fixed port, existing methods are able to associate only one user at a time with the fixed access port. This restriction is problematic when multiple subscribers require access to a single port, and when a single subscriber has multiple subscriber identities from the network's point of view, e.g., each identity has a different service policy.

Establishing a connection to a virtual private network, such as an ATM network, is well known in the field of telecommunications. For example, TELLO et al., U.S. Pat. No. 6,032,118, teach a method for accessing (and billing) a virtual private network through a data network from a remote location using terminals, such as desktop, laptop and notebook computers. The method of TELLO et al., however, is limited in that the authentication steps are cumbersome and inconvenient. In particular, the user must affirmatively select the identification and password and a virtual private network. An encryption key is then sent to the user, along with an authorization code upon password verification. Also, the method of TELLO et al. does not provide a registration process, by which the virtual private network would "memorize" the user's remote location and treat it as part of the network. Therefore, the user must repeat the authentication process each time access is attempted, even if using the same port.

The overarching need is to enable subscribers to a high speed network to access that network, even when calling from a remote location, so that appropriate corresponding service policies may be implemented. Also, the need includes permitting a nomadic subscriber to associate the temporary physical address with the subscriber's network for as long as the subscriber desires. Currently, the high speed networks and associated SVC connection systems do not meet these needs.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF EMBODIMENTS

In view of the above, the present invention through one or more of its various aspects and/or embodiments is presented to accomplish one or more objectives and advantages, such as those noted below. It is noted that although the embodiments described below are described with reference to ATM networks, any high speed network employing SVCs, such as an IP network and an optical network, can operate according to the principles of the present invention.

An aspect of the present invention provides a method for associating a switched virtual circuit (SVC) connection request in a high speed data network with a network subscriber. The method includes receiving a signaling protocol message requesting the SVC connection from the subscriber at an access port and determining whether the signaling protocol message contains authentication data to authenticate the subscriber. The access port may be different from a permanent access port of the subscriber. When the subscriber is authenticated, the SVC connection request is associated with data from an account corresponding to the subscriber. The method may further include retrieving service policies from the subscriber account; determining from the service policies whether the subscriber is entitled to access the network from the access port, as requested; and enabling access to the high speed network when the service policies entitle the subscriber to make the requested access. An address of the access port in the network may be registered by substituting the address of the access port for an existing subscriber address.

Another aspect of the present invention provides a method for associating an SVC connection request from one of multiple subscribers at a single access port in a high speed data network, which includes receiving a signaling protocol message requesting the SVC connection from the access port. The signaling protocol message includes multiple data fields. Authentication data is retrieved from at least one of the data fields and compared with multiple network subscriber accounts. The SVC connection request is associated with the network subscriber account corresponding to the authentication data. At least one other of the subscribers can request simultaneously an SVC connection from the same access port.

A network access port address corresponding to the access port may be retrieved from a second one of the data fields. A registration address associated with the network subscriber account may then be changed from an original access port address to the network access port address. Furthermore, at least one other connection request may be received from another user of the high speed network, where the request is directed to the subscriber. The connection request is terminated to the registration address.

Another aspect of the present invention provides a method for associating a network policy with a subscriber in an ATM network, which includes rights for establishing an SVC connection. The method includes interfacing between the ATM network and the subscriber through an ATM compatible access port; receiving at the ATM network a conventional signaling protocol message requesting the SVC connection; and determining whether the signaling protocol message contains a first identification number associated with the subscriber. When the signaling protocol message contains the first identification number, it is determined whether the signaling protocol message contains a second identification number that correctly corresponds to the first identification number. The first identification number may include a publicly known number associated with the subscriber and the second identification number may include an encrypted private password associated with the first identification number. When the signaling protocol message contains the correctly corresponding second identification number, the service policy is retrieved from an account associated with the first identification number and the second identification number. It is determined whether the retrieved service policy permits the subscriber to establish the SVC connection. The SVC connection is established when permitted by the retrieved service policy. The signaling protocol message may include a SETUP message, in which the first identification number may be contained in a first predetermined field and the second identification number may be contained in a second predetermined field.

The method may further include registering an address of the ATM compatible access port. The registration includes retrieving the ATM compatible access port address from a signaling protocol message, retrieving from a registration database registration data associated with the subscriber and replacing the predetermined ATM address with the ATM compatible access port address retrieved from the signaling protocol message. The registration data includes a predetermined ATM address.

Another aspect of the present invention provides a method for registering an access port of a subscriber in a high speed data network and includes establishing a connection between a subscriber terminal and a network registration database from the access port, retrieving from the registration database a registration address associated with the subscriber and replacing the registration address with an address of the access port. Connection requests directed to the subscriber are terminated at the address of the access port, indicated as the registration address associated with the subscriber. Also, prior to retrieving the registration address associated with the subscriber, the subscriber is authenticated. When the subscriber is successfully authenticated, the service policies corresponding to the subscriber are retrieved.

The address of the access port may be different from an address of a preexisting access port of the subscriber. The method then includes replacing the registration address with the address of the preexisting access port prior to the subscriber disconnecting from the high speed network. Connection requests directed to the subscriber are terminated at the address of the preexisting access port, indicated as the registration address associated with the subscriber.

Another aspect of the present invention provides a system for processing an SVC connection request in a high speed data network, including a registration server that stores at least one identification number associated with a network subscriber, a database that stores at least one policy defining permission to establish SVC connections and at least one switch in the high speed data network that accesses the registration server and the database. The switch is accessible by at least one access port, connectable to the switch, which enables the network subscriber to interface with the high speed data network from a subscriber terminal. The switch receives a protocol message from the subscriber terminal requesting the SVC connection from the access port, accesses the registration server to determine whether the protocol message contains valid authentication data, retrieves the at least one policy associated with the network subscriber from the registration database when the protocol message contains valid authentication data, and establishes the SVC connection according to the at least one policy. The access port may be different from a previously established access port of the network subscriber. Also, the server may register an address of the access port in place of an address of the previously established access port associated with the ATM subscriber.

An aspect of the present invention provides a system for processing services of a subscriber in an ATM network, including establishing an SVC connection. The system includes a registration server that stores authentication data associated with the subscriber; a service database that stores at least one ATM policy for establishing the SVC connection; and at least one ATM switch that accesses the registration server and the service database. The authentication data includes an identification number and a password. The ATM switch is connectable to an access port that enables the subscriber to interface with the ATM network from a subscriber terminal. The registration server determines whether a signaling protocol message requesting the SVC connection, received from the access port, includes the identification number and the password associated with the subscriber. When the protocol message includes the identification number and the password, the ATM switch accesses the service database to determine the ATM service policies associated with the subscriber and processes the SVC connection request according to the ATM service policies.

The authentication data may be contained in at least one of multiple pre-determined fields of an ATM SETUP message of the signaling protocol message. The registration server may store an address of the access port contained in one of the predetermined fields and substitute the stored address of the access port for a preexisting address of another access port of the subscriber.

Yet another aspect of the present invention provides a system for registering an access port of a subscriber in an ATM network, including a registration server that stores an original port address as a registration address associated with a subscriber and at least one ATM switch in the ATM network that accesses the registration server. The ATM switch is connectable to at least one access port that enables the ATM subscriber to interface with the ATM network from a terminal. The ATM switch interfaces the terminal to the registration server from the access port. The registration server changes the registration address from the original port address to an address corresponding to the access port, such that subsequent ATM network connection requests directed to the subscriber are terminated at the terminal via the access port. The registration server may store the address of the access port in place of the original port address when the ATM subscriber instructs the registration server to register the access port.

Another aspect of the present invention provides a computer readable medium for storing a computer program that associates an SVC connection request in a high speed data network with a network subscriber. The computer readable medium includes a receiving source code segment that receives a signaling protocol message requesting the SVC connection from the subscriber at an access port; an authentication source code segment that determines whether the signaling protocol message contains authentication data to authenticate the subscriber; and an associating source code segment that associates the SVC connection request with data from an account corresponding to the subscriber when the subscriber is authenticated. The computer readable medium may further include a retrieving source code segment that retrieves service policies from the subscriber account; a determining source code segment that determines from the service policies whether the subscriber is entitled to access the network from the access port, as requested; and an enabling source code segment that enables access to the high speed network when the service policies entitle the subscriber to make the requested access. The access port may be different from a permanent access port of the subscriber. There may also be a registering source code segment that registers an address of the access port in the network by substituting the address of the access port for an existing subscriber address.

Another aspect of the present invention provides a computer readable medium for storing a computer program that registers an access port of a subscriber in a high speed data network. The computer readable medium includes a connecting source code segment, a retrieving source code segment and a replacing source code segment. The connecting source code segment establishes a connection between a subscriber terminal, which accesses the high speed data network from the access port, and a network registration database. The retrieving source code segment retrieves from the registration database a registration address associated with the subscriber. The replacing source code segment replaces the registration address with an address of the access port. The address of the access port may be different from an address of a preexisting access port of the subscriber.

The computer readable medium for storing a computer program may also include a terminating source code segment that terminates connection requests directed to the subscriber at the address of the network access port, indicated as the registration address associated with the subscriber. There may also be included an authenticating source code segment and a service policy source code segment. The authenticating source code segment authenticates the subscriber prior to the retrieving source code segment retrieving the registration address associated with the subscriber. The service policy source code segment retrieves a service policy corresponding to the subscriber when the subscriber is successfully authenticated in accordance with the authenticating source code segment. The computer readable medium may further include a replacing source code segment and a terminating source code segment. The replacing source code segment replaces the registration address with the address of the preexisting access port prior to the subscriber disconnecting from the high speed network. The terminating source code segment terminates connection requests directed to the subscriber at the address of the preexisting access port, indicated as the registration address associated with the subscriber.

The present invention enables a high speed network, such as an ATM network, an optical network, or the like, to dynamically apply the individual service policies of a network subscriber through any compatible interface, or port. Thus, the appropriate service policy can even be applied when the subscriber accesses the network from a port remote from the subscriber's permanent port. Generally, regardless of the port used to access a high speed network, the subscriber will be able to implement the personalized service rights and restrictions applicable to the subscriber. Furthermore, an aspect of the invention enables the network to register an access location of the subscriber for purposes of terminating connections intended for the subscriber to that location, regardless of the port being used for network access. In addition to the obvious convenience to the subscribers, the invention protects the network from unauthorized use of network services and SVC connections, including unauthorized use of excessive bandwidth.

Figure 1:
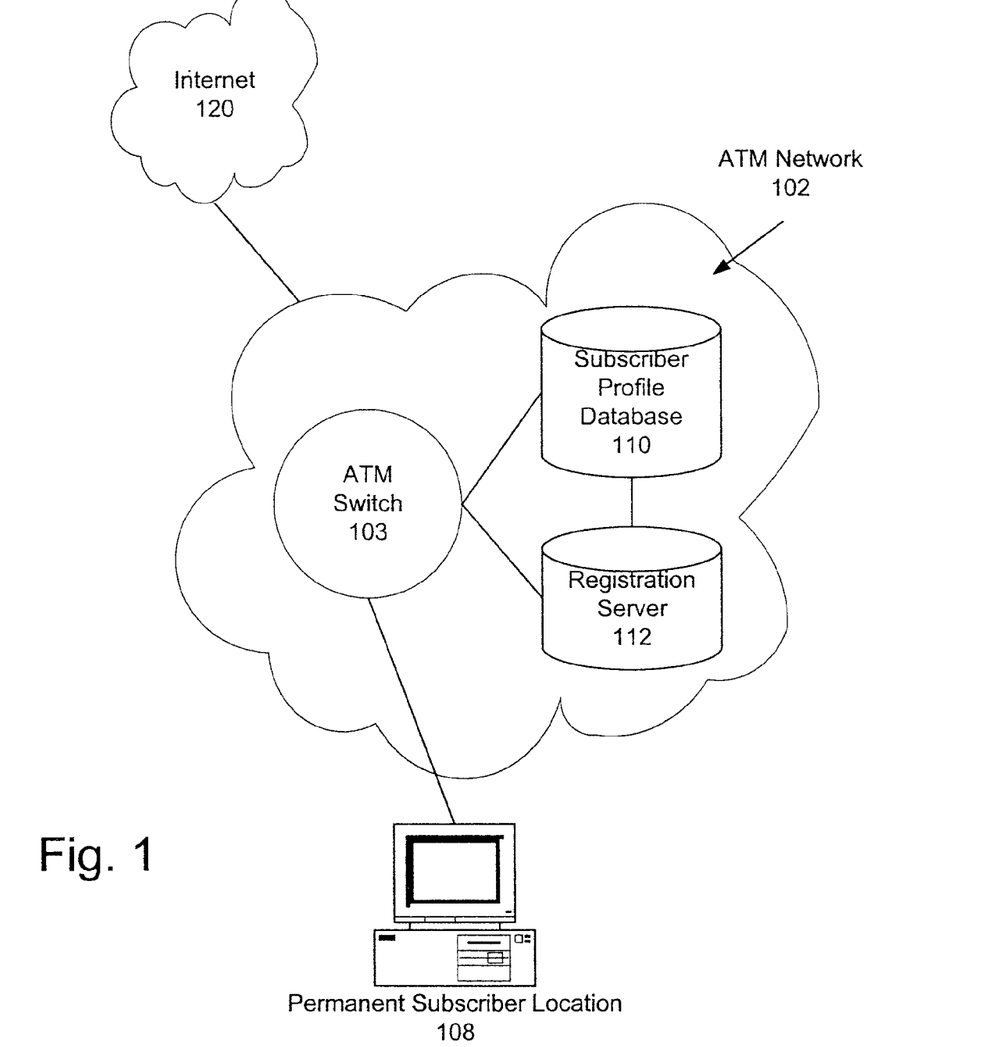
FIG. 1 is a block diagram showing an exemplary telecommunications network, according to an aspect of the present invention.

FIG. 1 depicts a simple exemplary network according to one embodiment of the invention. The core of the system is an ATM network 102. The ATM network 102 is based around a set of ATM capable switches, such as ATM switch 103. Although a single ATM switch 103 is shown, the ATM network 102 can (and usually does) include multiple ATM switches 103. The ATM switches may include, for example, CBX 500 Multiservice Wide-Area Network (WAN) and GX 550 Multiservice WAN switches manufactured by Lucent Technologies, Inc., or Alcatel 7440 Multiservice Switching Platforms manufactured by Alcatel, and associated software. The switches are able to support ATM User-Network Interface (UNI) Specification Version 3.1, or higher, software. The ATM switches of an ATM network are interconnected by point-to-point ATM links or interfaces.

Also included in the ATM network 102 are a subscriber profile database 110 and a registration server 112. In alternative embodiments of the invention, the subscriber profile database 110 and the registration server 112 may be incorporated in the switch 103, or the switch 103 may include a duplicate database having the same information as subscriber profile database 110 and the registration server 112.

The registration server 112 contains the subscribers' respective authentication information, including addresses, identification numbers and/or passwords for accessing the ATM network 102. The subscriber profile database 110 stores the service policies for each subscriber at a memory address corresponding to the subscriber. The service policies define the scope of ATM resources and services available to each subscriber, based on a previously established service agreement between the subscriber and the network operator. The service policies include information about a subscriber's priority, whether a subscriber is entitled to establish SVC connections and, if so, the maximum bandwidth available for the SVC connections. The service policies also include information about the various services to which the subscriber subscribes, including services internal to the ATM network 102 and otherwise accessible through the ATM network 102, such as access to the Internet 120 through an Internet service provider.

Interfacing with the ATM network 102 is a permanent subscriber location 108. In an embodiment of the invention, the subscriber location 108 is the permanent address with which the ATM network 102 associates the subscriber's ATM network-address and other identifying data, along with corresponding subscriber service policies. Subscriber location 108 may represent a single user or a group of users in a separate network, e.g., a private network (not pictured).

There are two fundamental types of circuits within an ATM network: permanent virtual circuits (PVCs) and switched virtual circuits (SVCs). The PVC connections are preprogrammed to exist between selected source and destination locations in the network. The SVC connections are temporarily and automatically established in response to signaling, on a per connection basis. SVCs are more flexible than PVC connections, and therefore may enhance the functionality of routine ATM network operations. The permanent subscriber location 108 may be connected to the ATM network 102 by a PVC connection or an SVC connection, depending on the requirements of the location and the function of the ATM network 102 with respect to the location.

Figure 2:
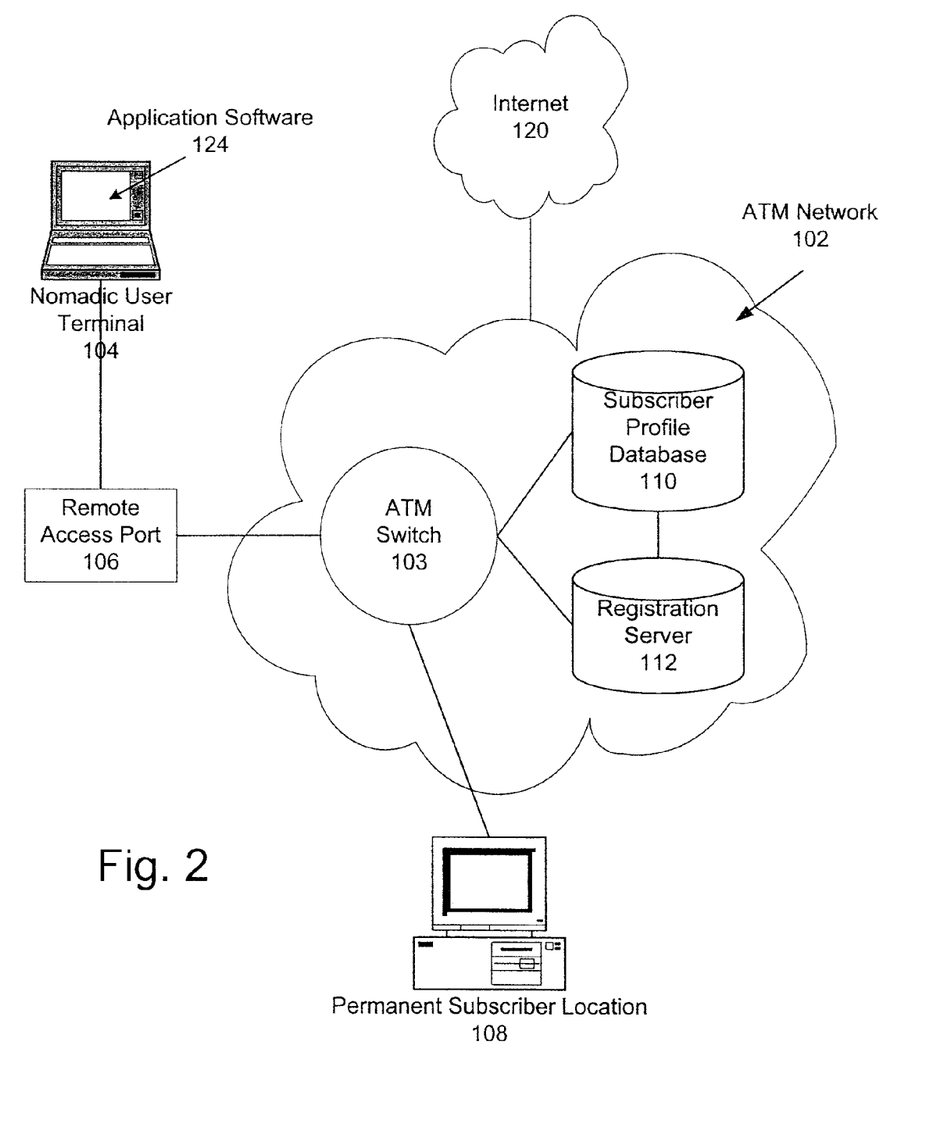
FIG. 2 is a block diagram showing an exemplary telecommunications network involving a nomadic user, according to an aspect of the present invention.

FIG. 2 is the same as FIG. 1, except that it also depicts a nomadic user terminal 104 connected to the ATM network through a remote ATM access port 106. A nomadic user is a subscriber who is attempting to access ATM network services from a location other than the subscriber's permanent location 108. The nomadic user terminal 104 may be any end terminal capable of accessing the ATM network 102, including, for example, laptop computers, personal computers, notebook computers, mobile telephones, personal digital assistants (PDA) and the like. The nomadic user terminal 104 runs various types of application software 124, which include applications for initiating the SVC connection with the ATM network 102. The application software 124 may include a unique publicly known identification number and associated secure password of the subscriber so that the ATM network 102 is able to recognize the subscriber, as described below.

Figure 3:
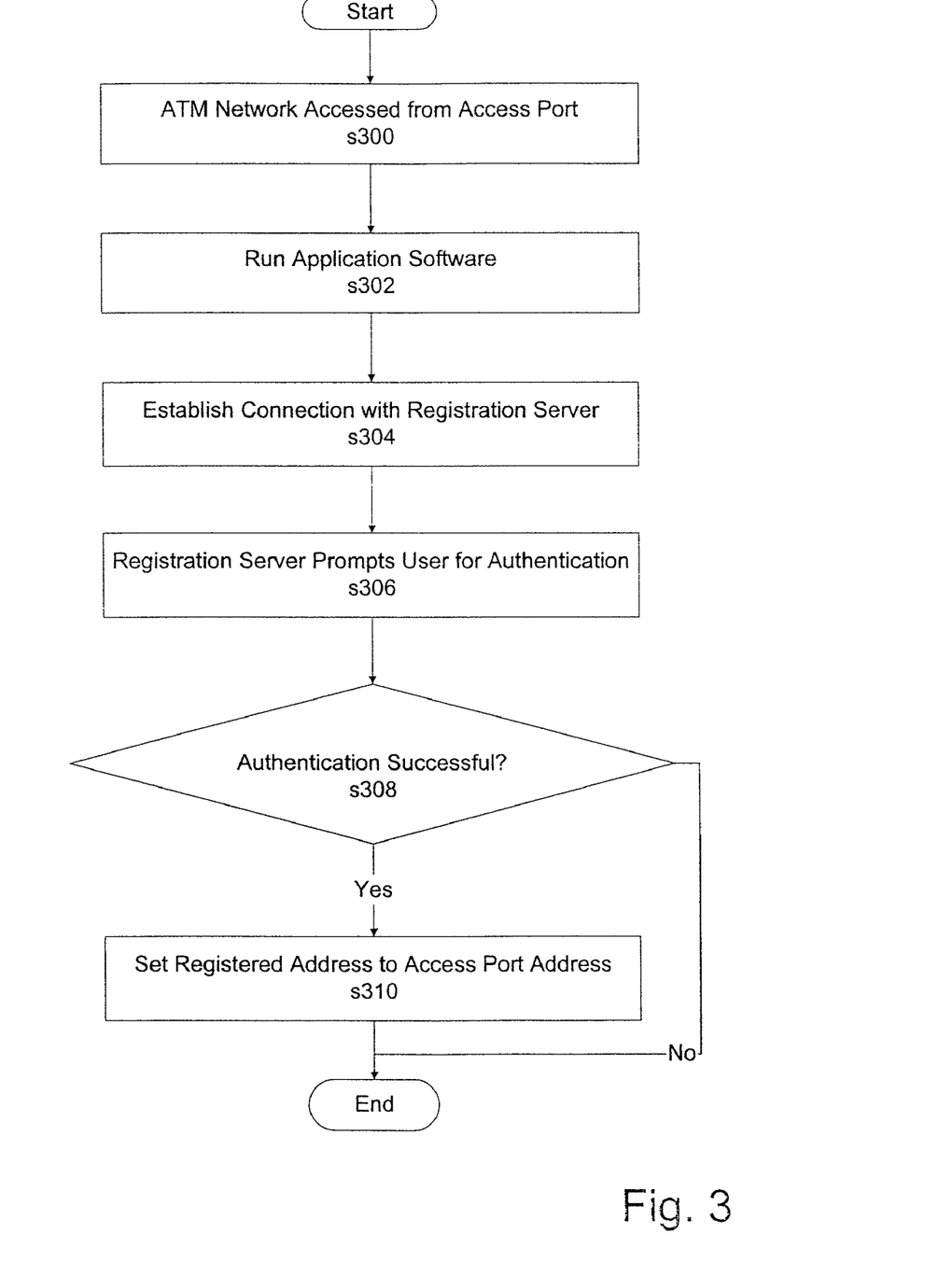
FIG. 3 is a flowchart showing an exemplary process for registering an access port with an ATM network, according to an aspect of the present invention.

FIG. 3 is a flowchart depicting an embodiment of the invention in which the subscriber accesses the network and "registers" the address of the access port to enable termination of SVC connections to the registered address. The registration process associates the subscriber with a particular access port or service. Although the discussion regarding the flowchart of FIG. 3 assumes a roaming subscriber, i.e., a nomadic user, it also relates generally to an alternative embodiment of the invention, in which the subscriber desires to register the address of his or her permanent location 108. Ordinarily, though, the address of the permanent location 108 is set in the registration server 112 as the "default" registration associated with the subscriber. Once the subscriber registers the address of an access port, the ATM network 102 remembers the registered location and sends incoming SVC connection requests to the registered access port.

At step s300, the subscriber accesses the ATM network 102 from the nomadic user terminal 104 via the remote access port 106, which in this exemplary embodiment is an access port other than the one with which the ATM network 102 ordinarily associates the subscriber. The remote access port 106 may be any public or private network port capable of connecting with the subscriber's ATM network 102, either directly or through other networks accessible to the subscriber's ATM network 102.

Accessing the ATM network 102 requires running registration application software 124 at step s302 of FIG. 3. In an embodiment of the invention, the software application 124 asks the subscriber for authentication data, such as a user identification number and password, which the subscriber provides to enable the application software 124. The application software then sets up an SVC to a predefined terminating address of the registration server 112 at step s304. The registration server 112 prompts the subscriber at step s306 for ATM network authentication data, which is stored in the registration server 112. The authentication data may include, for example, an account number and a password, which may be the same as the account number and password entered by the subscriber to activate the application software 124 at step s302.

Ordinarily, an access port is configured to accommodate only one subscriber at a time for registration purposes because the ATM network 102 associates the registration request with an address of the physical access port. However, the application software 124 can be modified, in conjunction with the ATM switch 103, to provide access port address information and subscriber identification information embedded in separate fields of a conventional signaling protocol message, as described below with respect to FIGS. 5 and 6. The ATM switch 103, along with any intervening ATM switches, would simply need to be configured to propagate the embedded information to the registration server 112. Multiple users would then be able to access the network for registration purposes from a single physical port.

At step s308, the registration server 112 determines whether the authentication data entered by the subscriber from the nomadic user terminal 104 corresponds to the stored authentication data. When the entered authentication data does not correspond, the registration attempt is terminated. When the entered authentication data does correspond, the subscriber sends a registration command via the application software 124, automatically or interactively, and the registration server 112 sets the registered address associated with the subscriber to match the address of the remote access port 106 at step 310. Thus, the SVC terminating address of the subscriber, previously associated for example with the permanent subscriber location 108, is set to the address of the remote access port 106. The ATM network 102 then correlates the subscriber's personal ATM address with the location address of the network port on which the connection was established, i.e., the remote access port 106. The subscriber may then interact with the ATM network 102 or simply log-off after registering the new address. All future SVC requests from other users addressed to the subscriber's personal ATM address will be automatically routed and terminated at the nomadic user terminal 104 through the remote access port 106.

Figure 4:
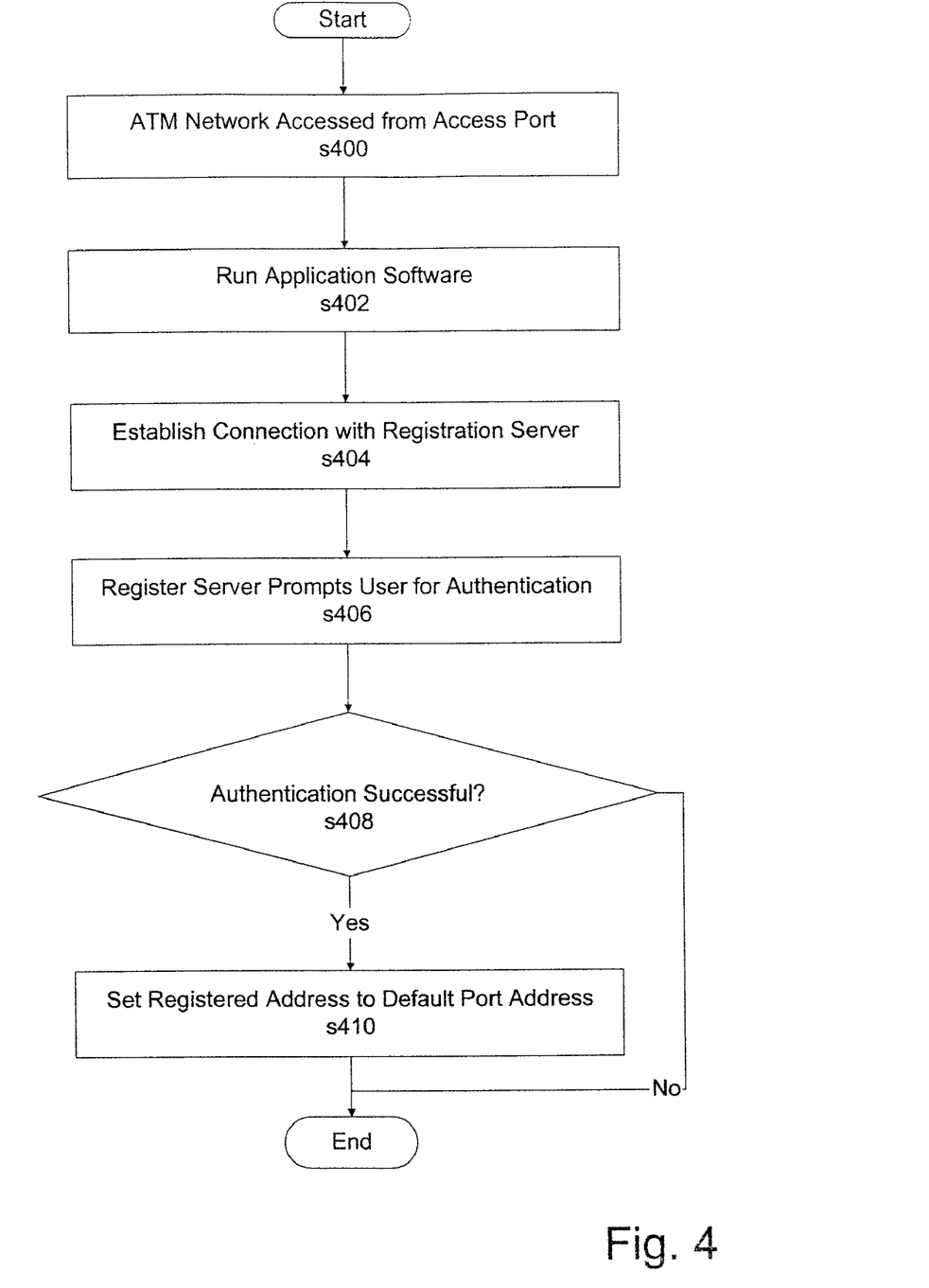
FIG. 4 is a flowchart showing an exemplary process for de-registering an access port from an ATM network, according to an aspect of the present invention.

FIG. 4 depicts the process by which the subscriber de-registers an ATM access port address. The process is similar to the registration process described with respect to FIG. 3 above. Initially, the subscriber accesses the ATM network 102 at step 400 from, for example, the nomadic user terminal 104 via the remote access port 106. At step s402, the nomadic user terminal 104 runs the application software 124, which establishes a connection with the terminating address of the registration server 112 at step s404. At step s406 the registration server 112 prompts the subscriber for authentication to access the ATM network. When the registration server 112 determines at step s408 that the authentication is not successful, the de-registration attempt is terminated and the registered address remains the same. When the authentication is successful, the subscriber sends a de-registration command via the application software 124, automatically or interactively, and the registration server 112 sets the registered address to the subscriber's default port address at step s410. The default port address is ordinarily the permanent subscriber location address 108, although an alternative port address may be programmed into the registration server, either by the service provider at the time the account is set up, or interactively at a later time by the subscriber, accessing the registration server 112 via the Internet, for example. The SVC terminating address is again set to the address of the permanent subscriber location 108.

In an embodiment of the invention, the de-registration process is initiated automatically whenever a session ends and the registered address in the registration server 112 is different from the default port address. When the subscriber indicates a desire to end the session and exit the ATM network by terminating all remaining SVC connections, the registration server compares the registered port address with the default port address. If the two port addresses match, the subscriber is disconnected from the ATM network 102 and the registration address remains unchanged in the registration server 112. If, however, the two port addresses do not match, the registered port address is set to the default port address. In one embodiment, when the two port addresses do not match, the subscriber is notified prior to logging-off that the registered port address is different from the default port address and queried whether de-registration is desired. If the subscriber indicates a desire to de-register, the terminating address at the registration server 112 is set to the default port address and the subscriber is disconnected from the ATM network 102. Otherwise, the registered port address remains unchanged in the registration server 112.

Figure 5:
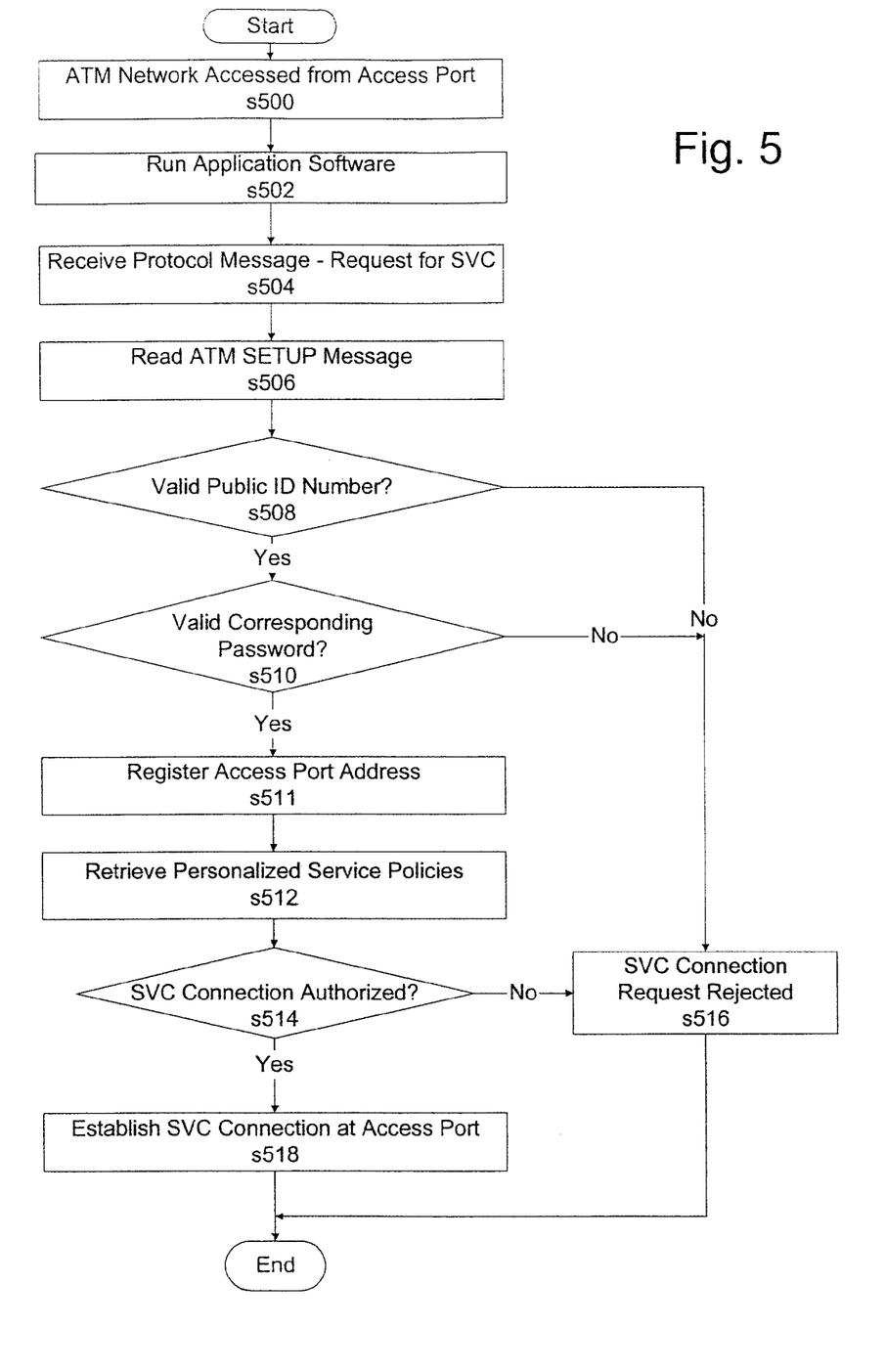
FIG. 5 is a flowchart showing an exemplary process for automatically authenticating a subscriber requesting a switched virtual circuit (SVC) connection to an ATM network and automatically registering the access port, according to an aspect of the present invention.

FIG. 5 is a flowchart depicting the process of a subscriber accessing the ATM network 102 through remote access port 106 and, in particular, being automatically authenticated for an SVC connection, as well as automatically registered at the current access port. Automatic registration is enabled by setting an auto-register switch associated with the subscriber in the registration server 112 to YES. The auto-register switch is previously set, for example, by the ATM network provider according to the subscriber's service policies, or by the subscriber by connecting to an ATM network provider web page and interactively setting the registration status. The web page may be accessed via an SVC connection in the ATM network or over the Internet, using any Internet compatible device.

Although FIG. 5 depicts a nomadic user, i.e., a subscriber accessing the ATM network from a port other than his or her permanent subscriber location 108, the authentication process is essentially identical regardless of the subscriber's location and access port. For example, FIG. 5 also depicts generally an embodiment of the invention in which the permanent subscriber location 108 routinely interfaces with the ATM network 102 via an SVC connection established on a per connection basis. Because the subscriber is able to originate the SVC connection request from any access port, though, it is necessary to securely identify the subscriber requesting the connection, so that appropriate personalized service policies are applied.

At step s500, the subscriber accesses the ATM network 102 from a port other than the permanent access port 108, with which the ATM network 102 ordinarily associates the subscriber. The remote access port may be any public or private network port capable of connecting with the ATM network 102, either directly or through other networks accessible to the ATM network 102. Accessing the ATM network 102 requires running SVC connection software application 124 at step s502. The software application 124 initiates the process by sending a signaling protocol message to request the SVC connection. In the system depicted in FIG. 5, the signaling protocol message is received by the exemplary ATM switch 103 at step s504.

Authorization of the subscriber is performed by the registration server 112, which receives the signaling protocol message from the ATM switch 103. The signaling protocol message enables authorization and includes, for example, a publicly known user identification number and encrypted password uniquely associated with the user identification number. Significantly, known signaling protocols can be utilized in the signaling protocol message. For example, the subscriber's user identification number can be encoded as an ATM address and stored in the CallingPartyNumber field of an ATM SETUP message sent from the roaming subscriber terminal 104. The encrypted password (e.g., an arbitrary 20 bytes of data) can be similarly stored in the CallingPartySubaddress field of the ATM SETUP message. Any other appropriate sized and available fields within a signaling protocol message may be used for storing user identification numbers and passwords in alternative embodiments of the invention. Furthermore, the conventional signaling protocol message may also include an access port address stored in a third field, which would enable multiple users to register a network address from a single access port (e.g., remote access port 106).

At step s506, the SETUP message data, which has been forwarded by the ATM switch 103 to the registration server 112, is read for authentication of the subscriber. The registration server 112 first determines at step s508 whether the SETUP message contains a user identification number and, if so, whether the user identification number corresponds to a network subscriber. For example, if the CallingParty-Number is a blank field, or if it contains a number that does not match a current subscriber's user identification number (as indicated in the subscriber data stored at the registration server 112), the registration server 112 instructs the ATM switch 103 to reject the SVC connection request at step s516, terminating the connection process.

If there is a valid user identification number, the registration server 112 determines at step s510 whether the SETUP message contains an encrypted password and, if so, whether the password corresponds to the user identification number. For example, if the CallingPartySubaddress is a blank field, or if the password contained in the CallingPartySubaddress does not correspond to the user identification number, the registration server 112 instructs the ATM switch 103 to reject the SVC connection at step s516. Again, the registration server 112 contains the preestablished password information associated with the user identification number.

The SETUP message, including the encrypted password, traverses only a small portion of the subscriber's carrier network, thereby reducing the likelihood of a third party successfully "eavesdropping" to obtain an encrypted password. To further enhance security, the encrypted password is not propagated in subsequent SETUP messages by intervening ATM switches in the connection path, as are most other protocol elements. Instead, the password is removed when used for authentication purposes. The user identification number (e.g., the subscriber's personal ATM address), however, would likely be serving the dual role of CallingPartyNumber, depending on the specific implementation, in addition to ATM network authentication. The personal identification number is therefore propagated according to current signaling specifications.

When the user identification and password provided in the ATM SETUP message match, the address of the remote access port 106 is automatically registered in the registration server 112 at step s511 because the registration flag has been set to YES. That is, the existing registered address is replaced by the address of the remote access port 106, as previously described for example with respect to FIG. 3. The automatic registration is transparent to the subscriber, assuring that the most current access port is registered, and thereby enabling the benefits of registration without the subscriber having to take the time to respond to registration related queries. Because there may be times when the subscriber prefers not to remain registered at an access port beyond the current session, the subscriber may invoke the deregistration procedure of FIG. 4 to de-register.

The personalized service policies associated with the identified subscriber are then retrieved from the subscriber profile database 110 at step s512 by the registration server 112, or alternatively, the ATM switch 103. The personalized service policies are preestablished contractually between the subscriber (or the subscriber's group) and the ATM network provider. Based upon the retrieved service policies, the registration server 112 (or ATM switch 103) first determines at step s514 whether the particular subscriber is authorized to establish SVC connections of the type and bandwidth requested based on the retrieved service policies. If not, the subscriber profile database 110 instructs the ATM switch 103 to reject the SVC connection request at s516, ending the process. If the service policies indicate that the subscriber is entitled to establish the requested SVC connection, the SVC connection is established from the remote ATM access port 106 to the destination port at step s518. The subscriber may then use the connection.

Significantly, in an embodiment of the invention, the authentication related steps s504 through s514 are performed transparently to the subscriber. Because the user identification number and password have been previously embedded in the protocol message, there are no interactive steps performed by the subscriber during the connection process. In other words, the ATM network 102 does not query the subscriber to enter any numbers or other information in order to establish the requested SVC connection or to implement the personalized services.

As a result, the connection process from the remote access port 106 is quick and efficient. Also, the subscriber does not need to memorize numbers or passwords for simply connecting with the network. This is especially advantageous where the subscriber is required to input additional identification numbers and/or passwords to execute selected services within the ATM network 102 after establishing the SVC connection, or to execute selected services connectable through the ATM network 102, such as the Internet 120. Also, the SVC connection request process may be embedded in any ATM related service or application, such as a game program, and is automatically performed each time the subscriber initiates the service or application. Furthermore, the authentication is provided in the same manner regardless of whether the executed service control and policy application is applied directly on the ATM switch or in an off-board connection control processor. It is noted that, in alternative embodiments, the application software 124 includes interactive steps for the subscriber to enter identification number and password information, as discussed below.

Because the identification and authentication are performed on a per connection basis, multiple users can simultaneously use the same network connection. The ATM network 102 can accurately associate SVC connection requests to the respective originating subscribers and apply the correct corresponding service policies based on the identification of each subscriber, as opposed to the physical port from which a communication is initiated. Also, a single individual may have more than one subscriber identity from the ATM network's point of view, e.g., a subscriber may pay for a publicly available version of a service, as well as belong to a corporate closed user group with access to the same service with different rights and privileges. In this situation, the individual subscriber has two different user identification numbers, yet is able to receive the correct services for each user identification number on the same access port and simultaneously, if so desired.

Figure 6:
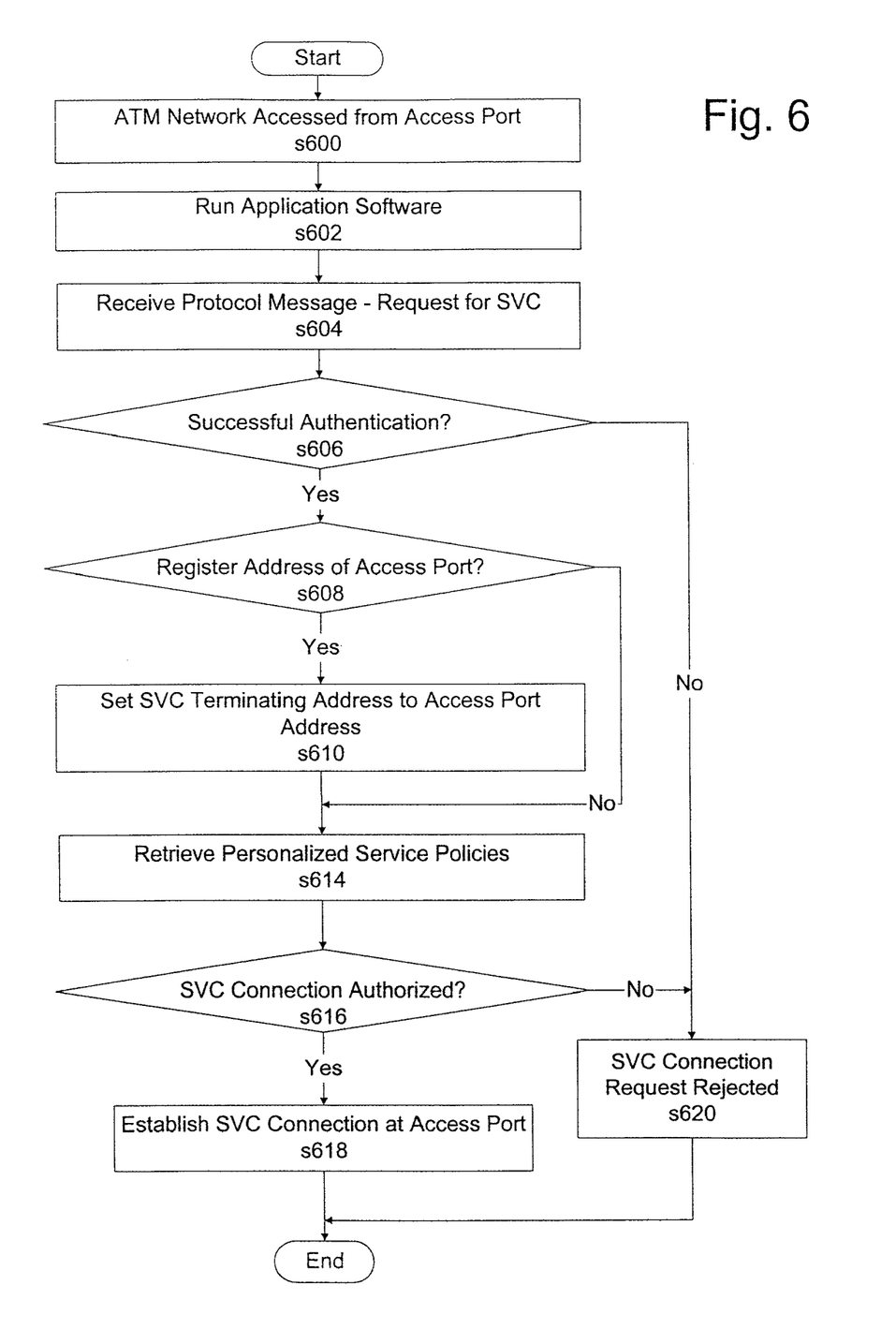
FIG. 6 is a flowchart showing an exemplary process for automatically authenticating a subscriber requesting an SVC connection to an ATM network and interactively registering the access port, according to an aspect of the present invention.

In another embodiment of the invention, an example of which is shown in FIG. 6, registration of the access port is not performed automatically when the subscriber accesses the ATM network to request an SVC connection, per the subscriber's service policies. In particular, the subscriber's autoregister switch is set to NO. The subscriber is therefore provided an option to interactively register the access port in the course of the connection process. Although FIG. 6 depicts a subscriber accessing the ATM network from a port other than his or her permanent subscriber location 108, the process is essentially identical regardless of the subscriber's location and access port. For example, FIG. 6 also depicts generally an embodiment of the invention in which the permanent subscriber location 108 routinely interfaces with the ATM network 102 via an SVC connection established on a per connection basis.

At step s600, the subscriber accesses the ATM network 102 from a port other than the permanent access port with which the ATM network 102 ordinarily associates the subscriber. Accessing the ATM network 102 entails running the application software 124 at step s602, which initiates the process by sending a conventional signaling protocol message requesting an SVC connection. In the system depicted in FIG. 6, the signaling protocol message is received by the exemplary ATM switch 103 at step s604.

The subscriber is then authorized at step s606 based on the subscriber's identification data embedded in the signaling protocol message, as described above with respect to steps s508 and s510 of FIG. 5. In particular, the protocol message may include, for example, a user identification number stored in the CallingPartyNumber field of an ATM SETUP message sent and an encrypted password stored in the CallingPartySubaddress field of the ATM SETUP message.

ATM switch 103 forwards the signaling protocol message to the registration server 112, which authenticates the subscriber based on stored information, as described above. If the identification data provided in the signaling protocol message does not match the subscriber's identification data in the registration server 112, the registration server 112 instructs the ATM switch 103 to reject the SVC connection request at step s620, terminating the SVC connection process.

If, however, the authentication is successful, the subscriber is presented the option of registering the remote access port 106 at step s608 of FIG. 6. For example, a message is sent to the nomadic user terminal 104 specifically asking whether the subscriber wishes to register the location. To perform step s608 in this manner, the registration server 112 sets up a temporary connection, e.g. an SVC connection, with the subscriber at the remote access port 106. The nomadic user terminal 104 receives the connection and the software application 124 responds by querying the subscriber whether port registration is desired. In an embodiment, the software application 124 runs a dialog box that enables the subscriber to check YES or NO next to the registration inquiry. The response is sent to the registration server 112, which terminates the SVC connection and proceeds accordingly.

In an alternative embodiment, the subscriber interaction with respect to registration occurs when the application software 124 is initially run at step s602. The application software 124 presents the registration query, in the form of a dialog box, for example, prior to sending the conventional signaling protocol message requesting the SVC connection. As described above, the subscriber selects YES to register the address of the remote access port 106 or NO to keep the registration information the same. The application software 124 then sends the subscriber's registration response in the conventional signaling protocol message, along with the initial SVC connection request, which the ATM switch 103 forwards to the registration server 112. In this embodiment, the registration server 112 determines at step s608 whether to register the address of the remote access port 106 by simply reading the previously obtained registration response.

In both embodiments, when the subscriber elects not to register the location (or when the subscriber does not have the ability to register the location), the registration data in the registration server 112 remains unchanged. All SVC connection requests will continue to be terminated at the subscriber's ATM address currently stored in registration server 112. The process then proceeds to step s614 to retrieve the subscriber's personalized service policies from the subscriber profile database 110. If at step s608 the registration server 112 determines that the subscriber has elected to register the remote access port 106, the registration server 112 sets the SVC terminating address to the address of the remote access port 106 at step s610. The ATM network 102 then correlates the subscriber's personal ATM address with the location address of the network port on which the connection has been established, i.e., remote access port 106. If the subscriber has a permanent subscriber location 108 that has already been associated with the subscriber's personal ATM address, the ATM address of remote access port 106 will be substituted for the ATM address of the permanent subscriber location. All SVC connection requests addressed to the subscriber's personal ATM address will then be automatically terminated at the nomadic user terminal 104 through the remote access port 106. Alternatively, the subscriber may identify any ATM address at step s610, i.e., not necessarily the address of the remote access port 106, as the registered SVC connection terminating address, discussed below.

Regardless of whether the subscriber elects to register the access port address, the subscriber is associated with his or her personalized services. The personalized service policies are provided by the subscriber profile database 110 at step s614 to the registration server 112. These service policies are preestablished contractually between the subscriber (or the subscriber's group) and the ATM network provider. Based upon the retrieved service policies, the registration server 112 first determines at step s616 whether the subscriber is authorized to establish the requested SVC connection based on the retrieved service policies. Alternatively, the subscriber profile database 110 provides the service policy information directly to the ATM switch 103. If the subscriber is not authorized to establish the requested SVC connection, the ATM switch 103 rejects the SVC connection request at step s620, ending the process. If the service policies indicate that the subscriber is authorized to establish an SVC connection, the SVC connection is established through the remote access port 106 at step s618.

Significantly, as described above, the authentication step s606 may be performed transparently to the subscriber. Because the user identification number and password have been previously embedded in the protocol message, no interactive steps need be performed by the subscriber during the connection process. In other words, the subscriber is not queried to enter any numbers, passwords or ATM addresses in order to establish the requested connection with the network or to implement the personalized service policies. As a result, the connection process from the remote access port 106 is quick and efficient. Also, the subscriber does not need to memorize numbers or passwords for simply connecting with the network. This is especially advantageous when the subscriber is required to input additional identification numbers and/or passwords to execute selected services within the ATM network 102 after establishing the SVC connection, or to execute selected services connectable through the ATM network 102, such as the Internet 120.

Because the authentication is performed on a per connection basis, multiple users can simultaneously use the same network connection. The ATM network 102 can accurately associate SVC connection requests to the respective originating subscribers and apply the correct corresponding service policies based on the independent identification of each subscriber. Also, a single individual may have more than one subscriber identity from the ATM network's point of view, e.g., a subscriber may pay for a publicly available version of a service, as well as belong to a corporate closed user group with access to the same service with different rights and privileges. In this situation, the individual subscriber has two different user identification numbers, yet is able to receive correct service for each user identification number on the same access port and simultaneously, if so desired.

In the embodiment of the invention depicted in FIG. 6, the same service options as described above are available upon dynamically registering the subscriber. For example, the subscriber may respond to the registration query at step s608 with a "forward-to" ATM address, to which the ATM network 102 will forward all connections addressed to the subscriber's personal ATM address. The "forward-to" address provided by the subscriber is different from both the remote access port 106 address and the permanent subscriber location 108 address. A "forward-to" address may include, for example, a message center address or a personal assistant's address, which the subscriber would like to have handling incoming connections.

The registration process may also include additional flexibility to the subscriber, extending beyond simply registering access port addresses. For example, the application software 124 may enable various options for the subscriber to customize the extent of registration, such as specifying an alternative, e.g., forward-to," access port address only for attempted connections from preferred ATM addresses, pre-identified by the subscriber. The subscriber is then able to accept, for example, incoming connections from only his or her home office, assistant, family members, or other high priority sources. Such customized registration may better suit the subscriber's needs than simply registering a new address for all terminating connections.

Figure 7:
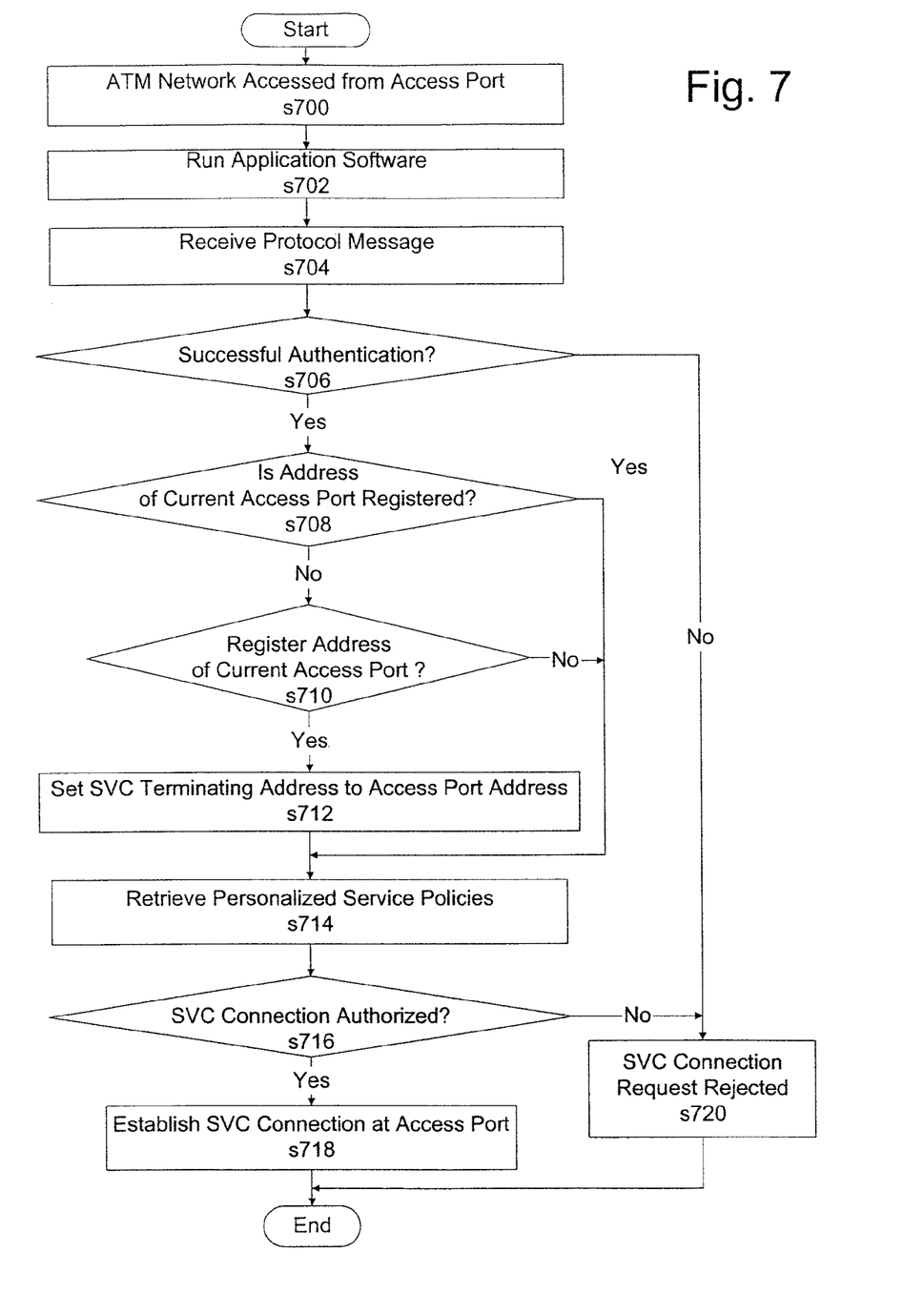
FIG. 7 is a flowchart showing an exemplary process for interactively authenticating a subscriber requesting an SVC connection to an ATM network and interactively registering the access port, according to an aspect of the present invention.

FIG. 7 is a flowchart depicting the process of a subscriber accessing the ATM network 102 through the remote access port 106, but without automatic authentication for SVC privileges or automatic registration of the remote access port 106 used. The subscriber is therefore interactively provided options to qualify for SVC connections according to the subscriber's service policies, as well as to register the access port in the course of the connection process. Although FIG. 7 depicts a subscriber accessing the ATM network from a port other than his or her permanent subscriber location 108, the process is essentially identical regardless of the subscriber's location and access port.

At step s700, the subscriber accesses the ATM network 102 from a port other than the permanent access port with which the ATM network 102 ordinarily associates the subscriber. Accessing the ATM network 102 entails running the application software 124 at step s702, which initiates the process by sending a conventional signaling protocol message requesting an SVC connection. In the system depicted in FIG. 7, the signaling protocol message is received by the exemplary ATM switch 103 at step s704.

Unlike the system depicted in FIGS. 5 and 6, the signaling protocol message received by the ATM switch 103 and forwarded to the registration server 112, does not contain all of the data needed for full authentication of the subscriber. For example, the message may contain no authentication data, although the more likely scenario is that the message contains only the subscriber's identification number and no password. Therefore, at step s706, the subscriber is prompted to enter the missing authentication data, as determined by the registration sever 112. In order to prompt the subscriber, the registration server 112 must first establish an SVC connection with the remote access port 106, as described above with respect to interactive registration at step s608 of FIG. 6. Assuming the subscriber's identification number is embedded in the signaling protocol message, as described above, the subscriber enters the associated password. If the identification data provided by the subscriber and/or the signaling protocol message does not match the subscriber's identification data in the registration server 112, the registration server 112 instructs the ATM switch 103 to reject the SVC connection request at step s720, terminating the SVC connection process.

If, however, the authentication is successful, the registration server 112 determines whether the access port presently used by the subscriber, e.g., the remote access port 106, is currently registered. If it is, the process simply proceeds to step s714 and retrieves the personalized service policies associated with the subscriber. If the address of the remote access port 106 is not registered in the registration server 112, the subscriber is queried at step s710 whether registration of the access port address is desired. If not, the process proceeds to step s714 and retrieves the personalized service policies associated with the subscriber the subscriber. However, because the subscriber has not registered, any SVC connection requests directed to the subscriber's personal ATM address will not be terminated to currently used access port. If the subscriber elects to register the address of the remote access port 106 at step s710, the registration server 112 sets the SVC terminating address to the address of the remote access port 106 at step s712. The ATM network 102 then correlates the subscriber's personal ATM address with the location address of the network port on which the connection has been established, i.e., remote access port 106.

Regardless of the various access port registration options, the subscriber is ultimately associated with his or her personalized services policies at step s714, which may be provided by the subscriber profile database 110 to the registration server 112. As previously discussed in regard to other embodiments of the invention, these service policies are pre-established contractually between the subscriber (or the subscriber's group) and the ATM network provider. Based upon the retrieved service policies, the registration server 112 first determines at step s716 whether the subscriber is authorized to establish SVC connections based on the retrieved service policies. Alternatively, the subscriber profile database 110 provides the service policy information directly to the ATM switch 103. If the subscriber is not authorized to establish an SVC connection, the ATM switch 103 rejects the SVC connection request at step s720, ending the process. If the service policies indicate that the subscriber is authorized to establish an SVC connection, the SVC connection is established through the remote access port 106 at step s718. The ATM network connection is then processed according to the subscriber's personalized service policies at step s722.

The invention has been described with reference to several exemplary embodiments, although it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed:

1. A computer readable non-transitory storage medium for storing a computer program that associates a request for a virtual connection with a user account, the virtual connection request being initiated from a remote access port different from an access port previously associated with the account, the computer readable non-transitory storage medium comprising:
    a receiving code segment for receiving a signaling message requesting the virtual connection to be established from the remote access port, the signaling message comprising at least one field modified to include an address of the remote access port;
    an associating code segment for associating the virtual connection request with information from the account, the information indicating whether the requested virtual connection is permitted; and
    a registering code segment for retrieving the address of the remote access port from the at least one field and for registering the address of the remote access port in association with the account, the registering comprising substituting the address of the remote access port for an address corresponding to the access port previously associated with the account.

2. The computer readable non-transitory storage medium according to claim 1, further comprising:
    an establishing code segment for establishing the virtual connection through the remote access port when the account information indicates that the requested virtual connection is permitted.

3. The computer readable non-transitory storage medium according to claim 1, further comprising:
    an authentication code segment for determining whether the signaling message contains authentication data and for authenticating the account based on the authentication data,
    wherein the registering code segment registers the address of the remote access port in association with the account after the account is authenticated.

4. The computer readable non-transitory storage medium according to claim 3, wherein the authentication data comprises an identifier in a second field of the signaling message.

5. The computer readable non-transitory storage medium according to claim 4, wherein the authentication data further comprises a password in a third field of the signaling message.

6. The computer readable non-transitory storage medium according to claim 5, wherein the first modified field comprises a CallingPartyNumber field.

7. The computer readable non-transitory storage medium according to claim 6, wherein the third field comprises a CallingPartySubaddress field.

8. The computer readable non-transitory storage medium according to claim 5, further comprising:
    a removing code segment for removing the password from the signaling message after the account is authenticated.

9. The computer readable non-transitory storage medium according to claim 2, wherein the virtual connection comprises a switched virtual circuit (SVC).

10. A network node for setting up a virtual connection in a network based on a virtual connection request initiated from an access port different from a first location previously associated with an account of a user, the network node comprising:
    a receiver for receiving a signaling message from the access port requesting the virtual connection to be established from the access port, the signaling message comprising at least one field modified to include an address of the access port;
    a profile database for storing at least one service policy associated with the user account, the service policy defining at least one service available to the user; and
    a registration server for storing an address of the first location associated with the user account as a default registration, a first connection being established between the access port and the registration server, the registration server replacing the first location address with the access port address;
    wherein, based on the at least one service policy retrieved from the profile database, the registration server determines whether the user is authorized to establish the virtual connection.

11. The network node according to claim 10, wherein the first connection is established between the access port and the registration server based on a predefined terminating address of the registration server.

12. The network node according to claim 10, wherein the registration server further contains authentication information for accessing the network.

13. The network node according to claim 12, wherein the authentication information comprises a secure password, and the signaling message comprises a field that includes the password.

14. The network node according to claim 13, wherein the password is removed from the signaling message after the account is authenticated.

15. The network node according to claim 13, wherein the at least one field modified to include an address of the access port comprises a CallingPartyNumber field.

16. The network node according to claim 11, wherein the network comprises an ATM network.

17. The network node according to claim 16, wherein the virtual connection comprises a switched virtual circuit (SVC).

18. A method for setting up a virtual connection in a communications network based on a virtual connection request initiated from a second access port different from a first access port previously associated with an account of a user, the method comprising:

associating the user with the first access port;

establishing an initial connection with the second access port;

receiving a signaling message via the initial connection requesting the virtual connection to be established from the second access port, the signaling message comprising a first field modified to include an address of the second access port and a second field modified to include identification data associating the virtual connection request with the user account;

authenticating the virtual connection request based on the identification data;

determining whether the virtual connection is permitted based on at least one service policy associated with the user account; and replacing the first access port address with the second access port address when the virtual connection is permitted;

wherein the virtual connection is established from the second access port in the communications network when the virtual connection is permitted.

19. The method according to claim 18, further comprising:

receiving a deregistration request; and replacing the second access port address with the first access port address based on the deregistration request.

20. The method according to claim 18, wherein at least a portion of the identification data is removed from the signaling message after the signaling message is received via the initial connection.

* * * * *